(12) United States Patent
Sato

(10) Patent No.: US 11,843,603 B2
(45) Date of Patent: Dec. 12, 2023

(54) AUTHORIZATION SERVER, CONSENT PORTAL, RESOURCE SERVER AND USER REGISTRATION

(71) Applicant: FUJITSU LIMITED, Kawasaki (JP)

(72) Inventor: Izuru Sato, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 17/148,837

(22) Filed: Jan. 14, 2021

(65) Prior Publication Data
US 2021/0234859 A1    Jul. 29, 2021

(30) Foreign Application Priority Data
Jan. 28, 2020  (JP) ............................. 2020-011477

(51) Int. Cl.
*H04L 29/08*       (2006.01)
*H04L 29/06*       (2006.01)
*H04L 9/40*        (2022.01)

(52) U.S. Cl.
CPC ...... *H04L 63/0876* (2013.01); *H04L 63/0236* (2013.01); *H04L 63/102* (2013.01)

(58) Field of Classification Search
CPC ........................ H04L 63/0876; H04L 63/0236; H04L 63/102
USPC ............................................................ 726/4
See application file for complete search history.

(56) References Cited

U.S. PATENT DOCUMENTS

| 9,264,436 B2 | 2/2016 | Canning et al. | |
| 9,934,544 B1* | 4/2018 | Whitfield | G06Q 50/265 |
| 10,733,685 B1* | 8/2020 | Gailloux | H04W 12/02 |
| 2013/0185806 A1 | 7/2013 | Hatakeyama | |
| 2014/0337914 A1* | 11/2014 | Canning | H04L 63/10 726/1 |

(Continued)

FOREIGN PATENT DOCUMENTS

| CN | 105765944 A | 7/2016 | |
| JP | 2021114141 A * | 8/2021 | G06F 21/33 |

(Continued)

OTHER PUBLICATIONS

Extended European Search Report dated May 28, 2021 from European Application No. 21151103.5, 7 pages.

(Continued)

*Primary Examiner* — Haresh N Patel
(74) *Attorney, Agent, or Firm* — STAAS & HALSEY LLP

(57) ABSTRACT

A non-transitory computer-readable storage medium storing a program that causes a processor included in an authorization server to execute a process, the process includes storing an association relationship between a plurality of users who are owners of data, and a consent portal with which each of the plurality of users performs user registration, when consent of a user to access to data of a first condition is asked for by a client, detecting a target user who is an owner of data that matches the first condition, extracting a consent portal with which the target user performs user registration, from the association relationship, and obtaining an intention of consent or non-consent to access to the data, from the target user by using the extracted consent portal, and controlling an access by the client to data in the resource server, in accordance with the obtained intention.

6 Claims, 15 Drawing Sheets

(56) References Cited

U.S. PATENT DOCUMENTS

| | | | | |
|---|---|---|---|---|
| 2015/0149362 A1* | 5/2015 | Baum | ................... | G06F 21/602 |
| | | | | 705/51 |
| 2015/0237053 A1 | 8/2015 | Duggana et al. | | |
| 2019/0019184 A1* | 1/2019 | Lacey | ................... | G06Q 20/42 |
| 2019/0370487 A1* | 12/2019 | Veltman | ................ | H04L 9/3213 |
| 2020/0159957 A1* | 5/2020 | Reimers | ............. | G06F 21/6245 |

FOREIGN PATENT DOCUMENTS

| | | |
|---|---|---|
| WO | WO 2012/046670 A1 | 4/2012 |
| WO | 2013/066699 | 5/2013 |

OTHER PUBLICATIONS

Ogura et al., "A proposal of Consent Control in Distributed Data", 2019 Symposium Cryptography and Information Security Shiga, Japan, Jan. 22-23, 2019, the Institute of Electronics, Information and Communication Engineers Cited in JPOA dated Jun. 20, 2023 for corresponding Japanese Patent Application No. 2020-011477.
Office Action dated Jun. 20, 2023 for corresponding Japanese Patent Application No. 2020-011477 with Machine Translation.
Office Action dated Aug. 10, 2023 issued in corresponding Chinese Application No. 202110095624.6.

* cited by examiner

FIG. 8

| USER ID | CONSENT PROCESS URL |
|---|---|
| random256@example.org | https://api.example.org/post |
| super0@example.net | https://example.net/portalapi |
| user1@example.com | https://portal.example.com/api/user1 |

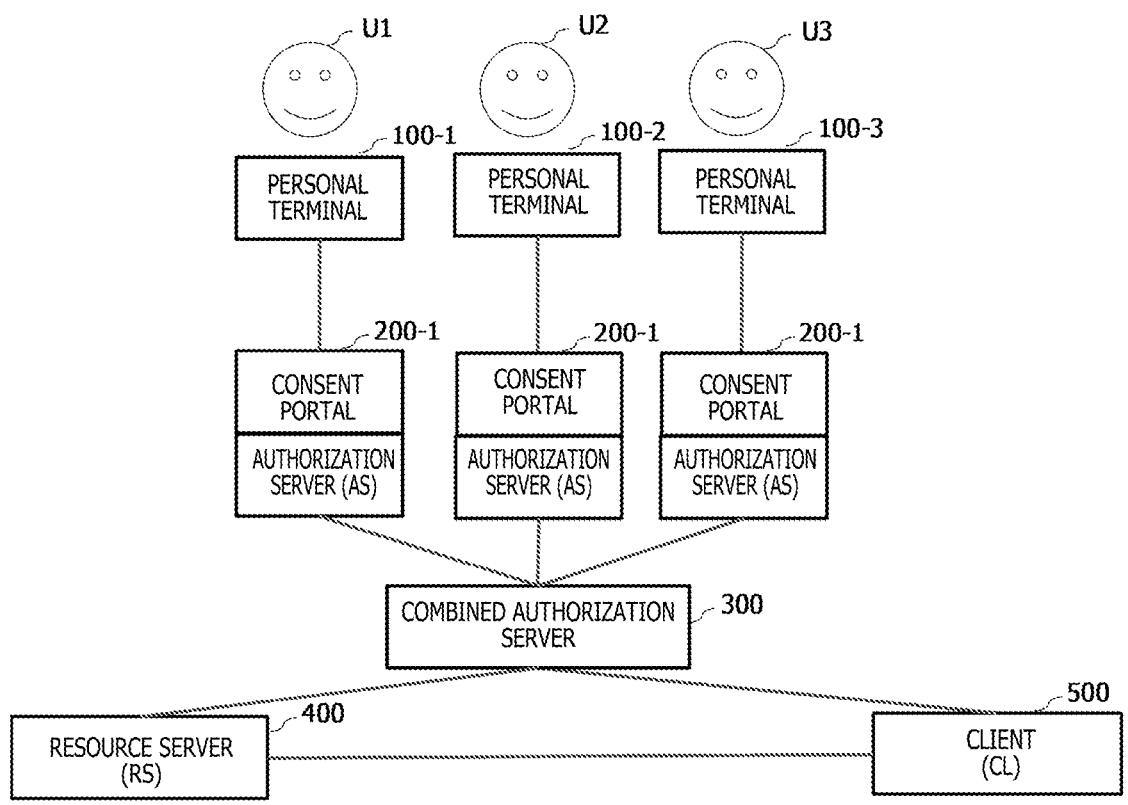

AUTHORIZATION SERVER, CONSENT PORTAL, RESOURCE SERVER AND USER REGISTRATION

CROSS-REFERENCE TO RELATED APPLICATION

This application is based upon and claims the benefit of priority of the prior Japanese Patent Application No. 2020-11477, filed on Jan. 28, 2020, the entire contents of which are incorporated herein by reference.

FIELD

The embodiments discussed herein are related to a non-transitory computer-readable storage medium, a data access control method, and an authorization server.

BACKGROUND

Recently, in some cases, companies have collected personal information and, based on the collected personal information, have determined the product lineup and have developed products. On the other hand, because it is difficult for companies to collect personal information, there are information management companies that collect personal information and provide the collected personal information to companies. An information management company extracts information desired by a company that is a client, for example, from personal information stored in a resource server (RS), and provides the extracted information to the client.

However, in order to provide personal information to a company, it may be desired to obtain consent of a user who is the source of the personal information. Therefore, the user performs user registration with a portal server, which is referred to as a consent portal, for giving consent (or non-consent) to providing personal information, and expresses an intention of consent (or non-consent) via the consent portal.

The consent portal includes, for example, an authorization server (AS). The authorization server is a server that controls access to personal information, and gives data access permission (or access restriction), for example, for each user or each data type, or for each client.

A client sends, to the authorization server, for example, a message to ask the user for consent. The authorization server waits for the user with the consent portal to consent to providing personal information.

When, for example, a client requests access to data, the resource server inquires of an authorization server corresponding to the user whether access is permitted.

Techniques regarding data access are described in, for example, Japanese Laid-open Patent Publication No. 2015-503145.

SUMMARY

According to an aspect of the embodiments, a non-transitory computer-readable storage medium storing a program that causes a processor included in an authorization server to execute a process, the process includes: storing an association relationship between a plurality of users who are owners of data, and a consent portal with which each of the plurality of users performs user registration; when consent of a user to access to data of a first condition is asked for by a client, detecting a target user who is an owner of data that matches the first condition, extracting a consent portal with which the target user performs user registration, from the association relationship, and obtaining an intention of consent or non-consent to access to the data, from the target user by using the extracted consent portal; and controlling an access by the client to data in the resource server, in accordance with the obtained intention.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a consent portal association table 324 after a user registration request in S103 is received;

FIG. 15 is a diagram illustrating an example of a configuration of the data management system 10.

DESCRIPTION OF EMBODIMENTS

In the related art, when a user stores various types of data in a plurality of resource servers, the user is to perform user registration with the respective authorization servers and consent portals corresponding to the resource servers. The timings at which consent of the user to access to personal information is asked for are unclear, and therefore the user is to regularly check each of the plurality of consent portals with which the user has performed user registration.

Therefore, a disclosure provides a data access control program, a data access control method, and an authorization server that reduce burden regarding consent of a user.

First Embodiment

A first embodiment will be described.

<Example of Configuration of Data Management System>

Figure 1:
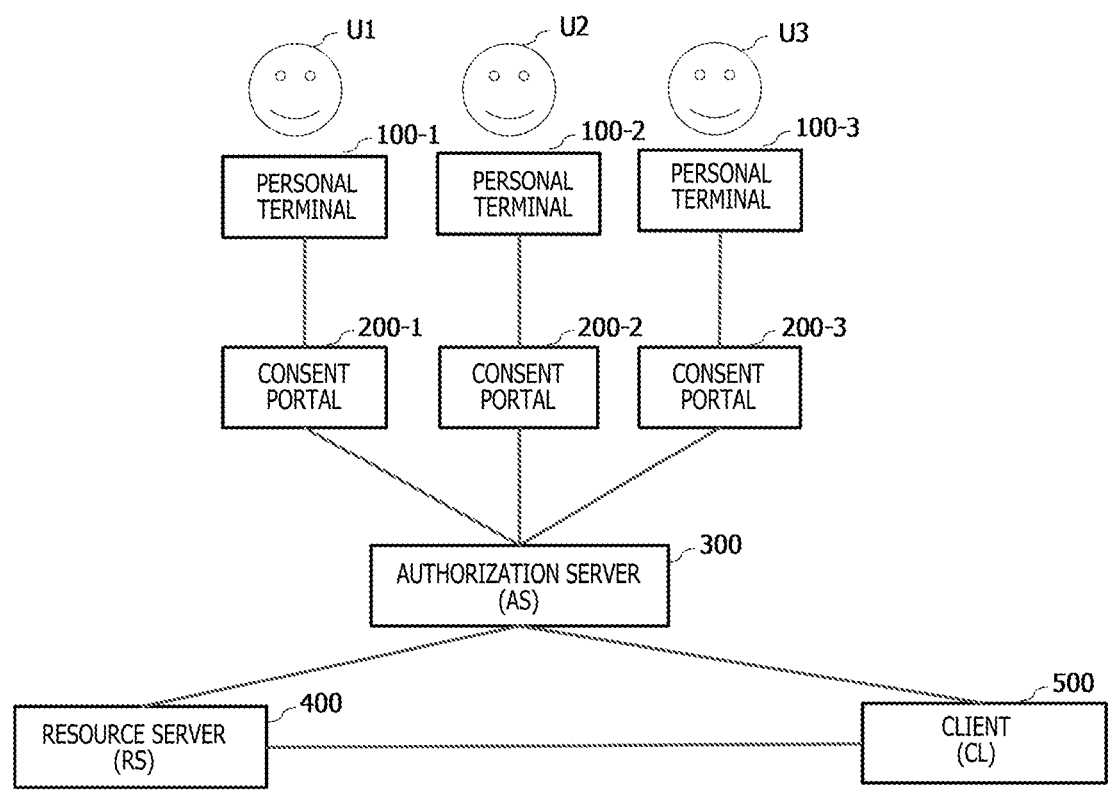
FIG. 1 is a diagram illustrating an example of a configuration of a data management system 10.

FIG. 1 is a diagram illustrating an example of a configuration of a data management system 10. The data management system 10 includes personal terminals 100-1 to 100-3 that users U1 to U3 respectively use, consent portals 200-1 to 200-3 respectively corresponding to the users U1 to U3, an authorization server 300, a resource server 400, and a client 500 (or a consent terminal). The data management system 10 is a system in which the users U1 to U3 store personal information in the resource server 400 and, as desired, the client 500 accesses the resource server 400 to acquire personal information.

The devices in the data management system 10 may be coupled to each other via networks and communicate to each other. The networks used for communication by the devices may be either the same network or different networks. Each of the networks may be coupled either in a wired manner or in a wireless manner.

The devices of the data management system 10 use an access management protocol to perform communication. The access management protocol includes, for example, User-Managed Access (UMA). The devices send and receive messages, for example, according to UMA during communication with each other.

The personal terminals 100-1 to 100-3 (which may hereafter be referred to as personal terminals 100) are terminal devices that are respectively used by the users U1 to U3 (which may hereafter be referred to as users), and are, for example, computers or portable terminal devices. The personal terminals 100 are coupled to and communicate with the consent portals 200-1 to 200-3 and the resource server 400 via networks in a wired manner or wirelessly.

The consent portals 200-1 to 200-3 (which may hereafter be referred to as consent portals 200) are portal sits that control consent processes of asking the user for consent (permission) to access to the personal information. The consent portal 200 provides, to the personal terminal 100, for example, notification to the effect that consent for certain personal information is asked for. When the consent portal 200 is notified by the personal terminal 100 that the user has consented (or has not consented), the consent portal 200 notifies the authorization server 300 that the consent has been given (or the consent has not been given).

The resource server 400 is a device that stores and manages the personal information of users, and is, for example, a server machine or a computer that includes a hard disk drive. The resource server 400, for example, manages personal information of a plurality of users. Although a single resource server 400 is illustrated in FIG. 1, there may be a plurality of resource servers 400. There may be a plurality of resource servers 400, for example, for each category of personal information to be stored. Categories are, for example, information representing the attributes of users and the attributes of personal information.

The client 500 is a company or an individual that acquires personal information from the resource server 400. The client 500 may represent a terminal device used by a client. The client 500 acquires access permission from the authorization server 300 and accesses the resource server 400, thereby acquiring personal information (data).

The authorization server 300 is a device that manages personal information stored in the resource server 400 and the consent portals 200 used by users, and is, for example, a server machine or a computer.

When the authorization server 300 is asked for permission to access personal information of a certain user, the authorization server 300 performs consent request processing of requesting the consent portal 200 used by the certain user to ask for user consent. The authorization server 300 stores consent information representing that the certain user has or has not consented to access to personal information, and controls access of the client 500 to the resource server 400, based on the consent information.

<Example of Configuration of Authorization Server 300>

Figure 2:
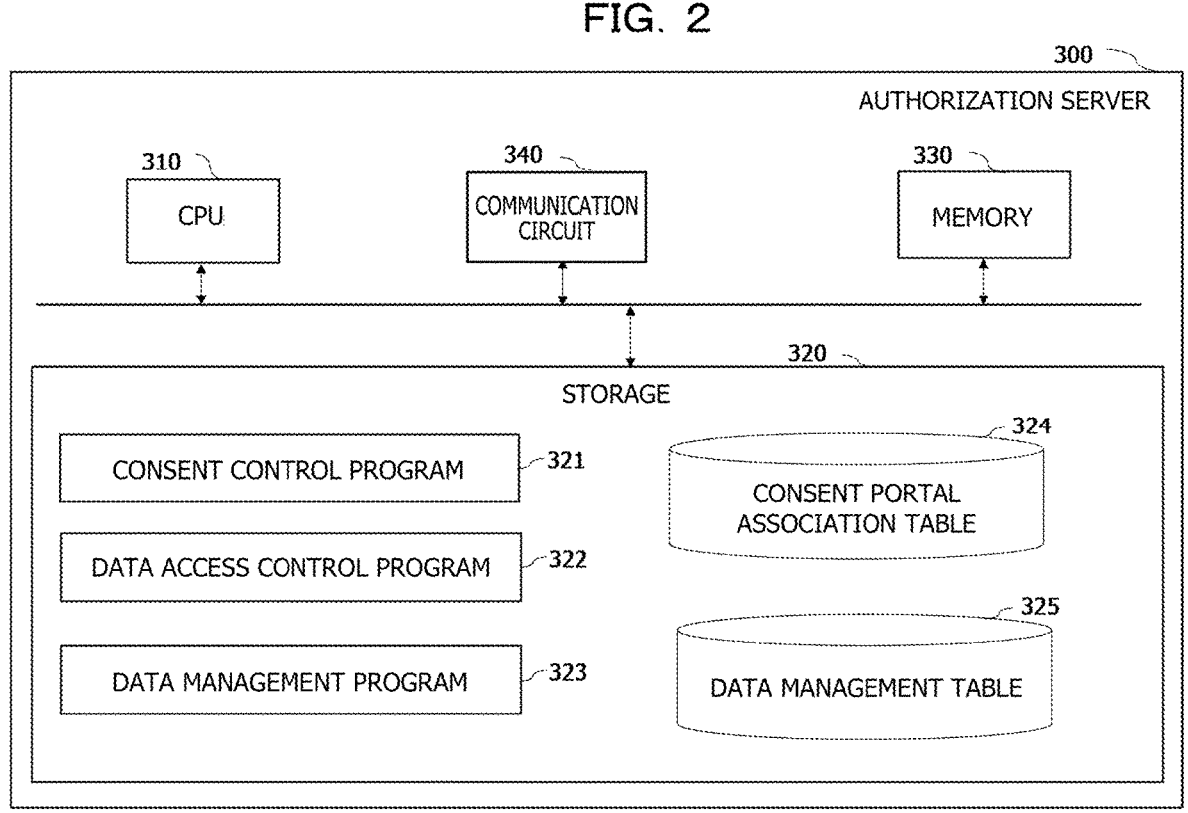
FIG. 2 is a diagram representing an example of a configuration of an authorization server 300.

FIG. 2 is a diagram representing an example of a configuration of the authorization server 300. The authorization server 300 is, for example, a server machine. The authorization server 300 includes a central processing unit (CPU) 310, a storage 320, a memory 330, and a communication circuit 340.

The storage 320 is an auxiliary storage device, such as a flash memory, a hard disk drive (HDD), or a solid-state drive (SSD), for storing programs and data. The storage 320 stores a consent control program 321, a data access control program 322, a data management program 323, a consent portal association table 324, and a data management table 325.

The memory 330 is an area in which a program stored in the storage 320 is loaded. The memory 330 may be used as an area in which a program stores data.

The communication circuit 340 is communication equipment for communicating with another device (such as the consent portals 200, the resource server 400, or the client 500). The authorization server 300 implements communication by sending and receiving packets via the communication circuit 340.

The CPU 310 is a processor that loads a program stored in the storage 320 into the memory 330 and executes the loaded program to construct each unit and to implement each process.

By executing the consent control program 321, the CPU 310 constructs a consent control unit and performs a consent control process. The consent control process is a process in which when a request from the client 500 who wants to access personal information of a certain user is made, the user is asked to consent to the access. In the consent control process, the authorization server 300 requests the consent portal 200 of the user to ask the user for consent, and obtains the intention of consent or non-consent of the user from the consent portal 200.

By executing the data access control program 322, the CPU 310 constructs an access control unit and performs a data access control process. The data access control process is a process of controlling access to personal information stored in the resource server 400 of the client 500. The authorization server 300 performs control so as to permit access of the client 500 to the personal information of the user if consent of the user is obtained, and so as not to permit the access if consent from the user is not obtained.

By executing the data management program 323, the CPU 310 constructs a data management unit and performs a data management process. The data management process is a process of managing personal information stored in the resource servers 400. In the data management process, the authorization server 300 manages what kind of personal information is stored in which resource server 400.

<Personal Terminal 100>

Figure 3:
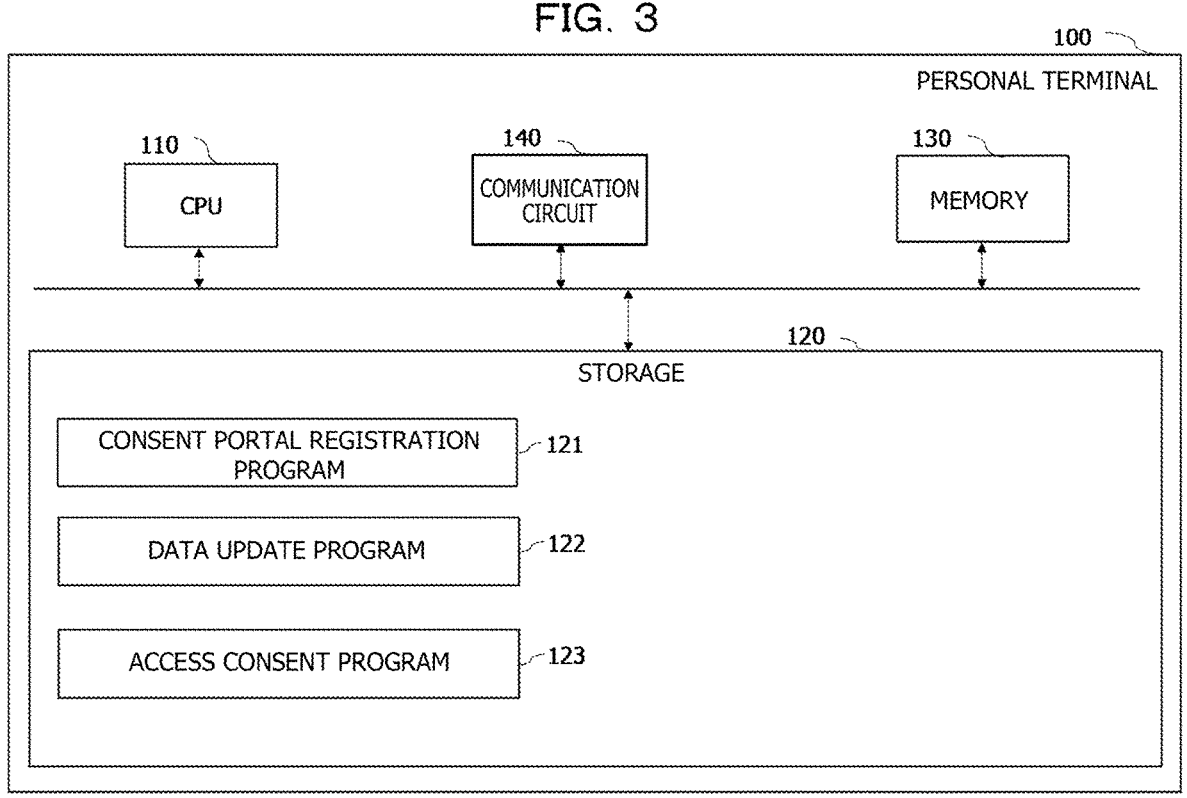
FIG. 3 is a diagram representing an example of a configuration of a personal terminal 100.

FIG. 3 is a diagram representing an example of a configuration of the personal terminal 100. The personal terminal 100 is, for example, a computer. The personal terminal 100 includes a CPU 110, a storage 120, a memory 130, and a communication circuit 140.

The storage 120 is an auxiliary storage device, such as a flash memory, an HDD, or an SSD, for storing programs and data. The storage 120 stores a consent portal registration program 121, a data update program 122, and an access consent program 123.

The memory 130 is an area in which a program stored in the storage 120 is loaded. The memory 130 may be used as an area in which a program stores data.

The communication circuit 140 is communication equipment for communicating with another device (such as the consent portals 200, the resource server 400, or the like). The personal terminal 100 implements communication by sending and receiving packets via the communication circuit 140.

The CPU 110 is a processor that loads a program stored in the storage 120 into the memory 130 and executes the loaded program to construct each unit and to implement each process.

By executing the consent portal registration program 121, the CPU 110 constructs a registration unit and performs a consent portal registration process. The consent portal registration process is a process in which a user registers with the consent portal 200 via the personal terminal 100. In the consent portal registration process, the personal terminal 100 causes a user to register with the consent portal 200 and acquires a consent process Uniform Resource Locator (URL) from the consent portal 200. The consent process URL is, for example, a URL that is used when the authorization server 300 asks the user for consent. In the consent portal registration process, the personal terminal 100 sends the identifier of a user who has registered with a consent portal (hereafter the identifier is referred to as a user ID) and the acquired consent process URL to the resource server 400.

By executing the data update program 122, the CPU 110 constructs an update unit and performs a data update process. The data update process is a process of storing personal information in the resource server 400.

By executing the access consent program 123, the CPU 110 constructs a consent unit and performs an access consent process. The access consent process is a process in which when consent to access to personal information is asked for by the consent portal 200, notification of an intention of consent or non-consent of the user is provided to the consent portal 200. In the access consent process, the personal terminal 100 displays, on a display, a button or the like indicating whether to consent or not, and obtains the intention of consent or non-consent of the user by an operation of the user (such as pressing the button indicating consent or non-consent).

<Resource Server 400>

Figure 4:
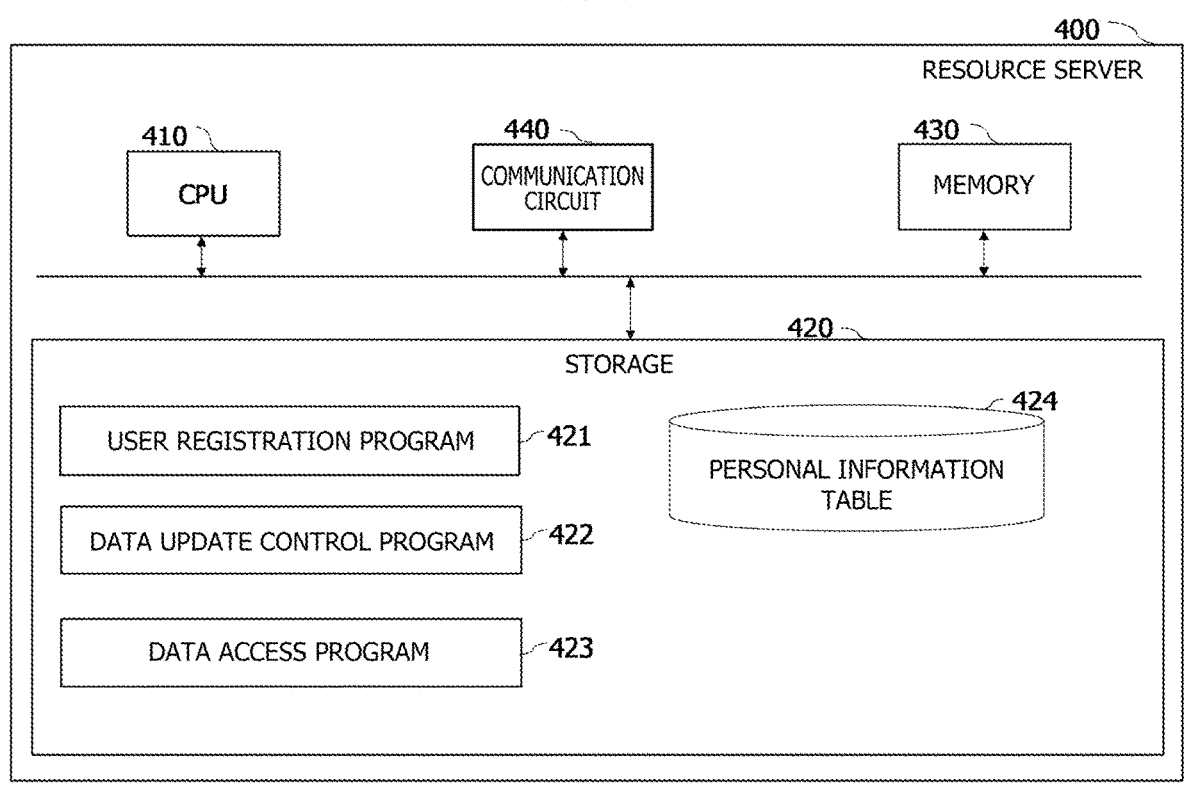
FIG. 4 is a diagram representing an example of a configuration of a resource server 400.

FIG. 4 is a diagram representing an example of a configuration of the resource server 400. The resource server 400 is, for example, a computer. The resource server 400 includes a CPU 410, a storage 420, a memory 430, and a communication circuit 440.

The storage 420 is an auxiliary storage device, such as a flash memory, an HDD, or an SSD, for storing programs and data. The storage 420 stores a user registration program 421, a data update control program 422, a data access program 423, and a personal information table 424.

The memory 430 is an area in which a program stored in the storage 420 is loaded. The memory 430 may be used as an area in which a program stores data.

The communication circuit 440 is communication equipment for communicating with another device (such as the personal terminal 100, the authorization server 300, or the like). The resource server 400 implements communication by sending and receiving packets via the communication circuit 440.

The CPU 410 is a processor that loads a program stored in the storage 420 into the memory 430 and executes the loaded program to construct each unit and to implement each process.

By executing the user registration program 421, the CPU 410 constructs a registration unit and performs a user registration process. The user registration process is a process of sending a user ID and a consent process URL received from the user or the personal terminal 100 to the authorization server 300, which handles the user ID and the consent process URL.

By executing the data update control program 422, the CPU 410 constructs an update control unit and performs a data update control process. The data update control process is a process of updating the personal information of a user. The resource server 400 receives data to be updated (to be registered) from the personal terminal 100 and updates the personal information table 424. In the data update control process, the resource server 400 stores personal information, and the user ID of the user and the corresponding consent process URL, in association with each other in the personal information table 424.

By executing the data access program 423, the resource server 400 constructs an access unit and performs a data access process. The data access process is a process in which the client 500 accesses data (personal information) in the resource server 400. In the data access process, the resource server 400 permits the client 500 authenticated by the authorization server 300 to access the data.

<Personal Information Acquisition Process>

A personal information acquisition process is a series of processes in which, in the data management system 10, the client 500 authenticated by the authorization server 300 acquires personal information (data) stored in the resource server 400. The personal information acquisition process, for example, includes an initial registration process, the access consent process, a data registration process, and an access control process. Each of the processes will be described below.

<Initial Registration Process>

Figure 5:
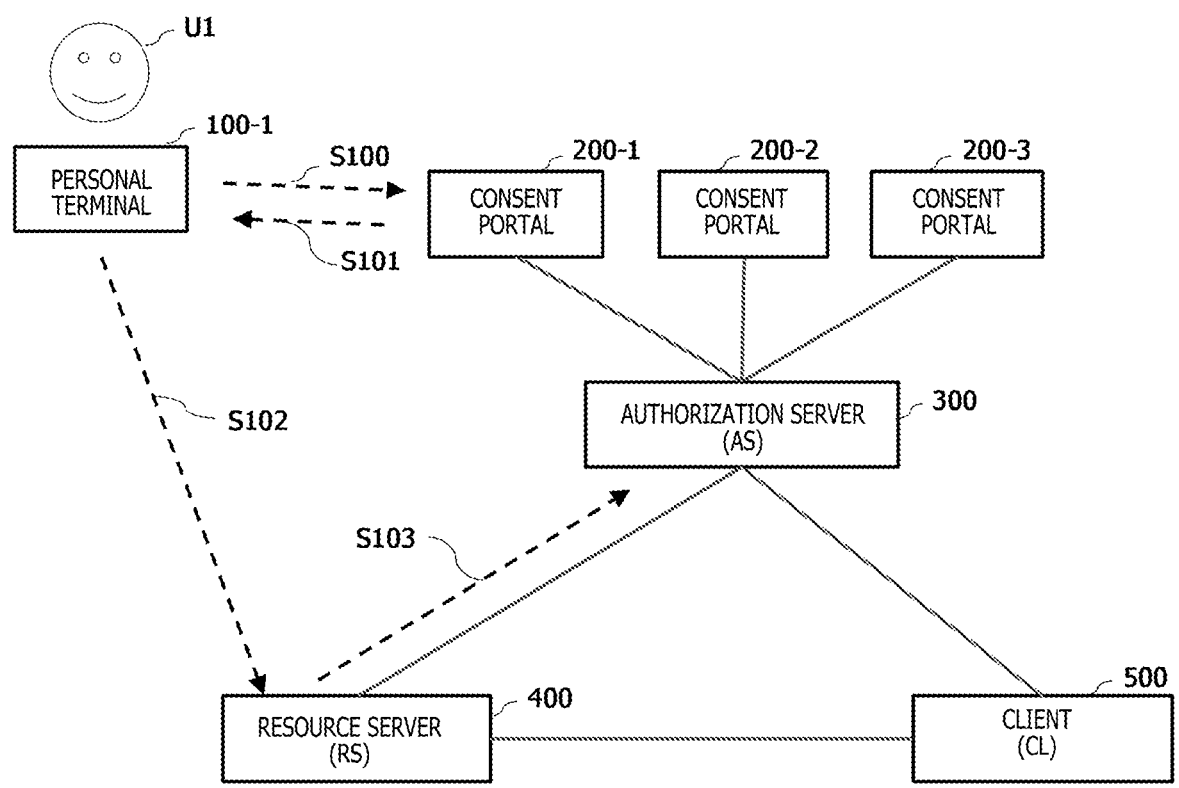
FIG. 5 is a diagram illustrating an example of a sequence of an initial registration process.

FIG. 5 is a diagram illustrating an example of a sequence of the initial registration process. The initial registration process is, for example, a process of registering a user in a consent portal selected by the user, or in a consent portal corresponding to the type of data to be registered or the resource server 400. An example of the case where a user U1 performs user registration with the consent portal 200-1 will be described below.

In the initial registration process, the user U1 performs a consent portal registration process S1000 of the personal terminal 100-1.

Figure 6:
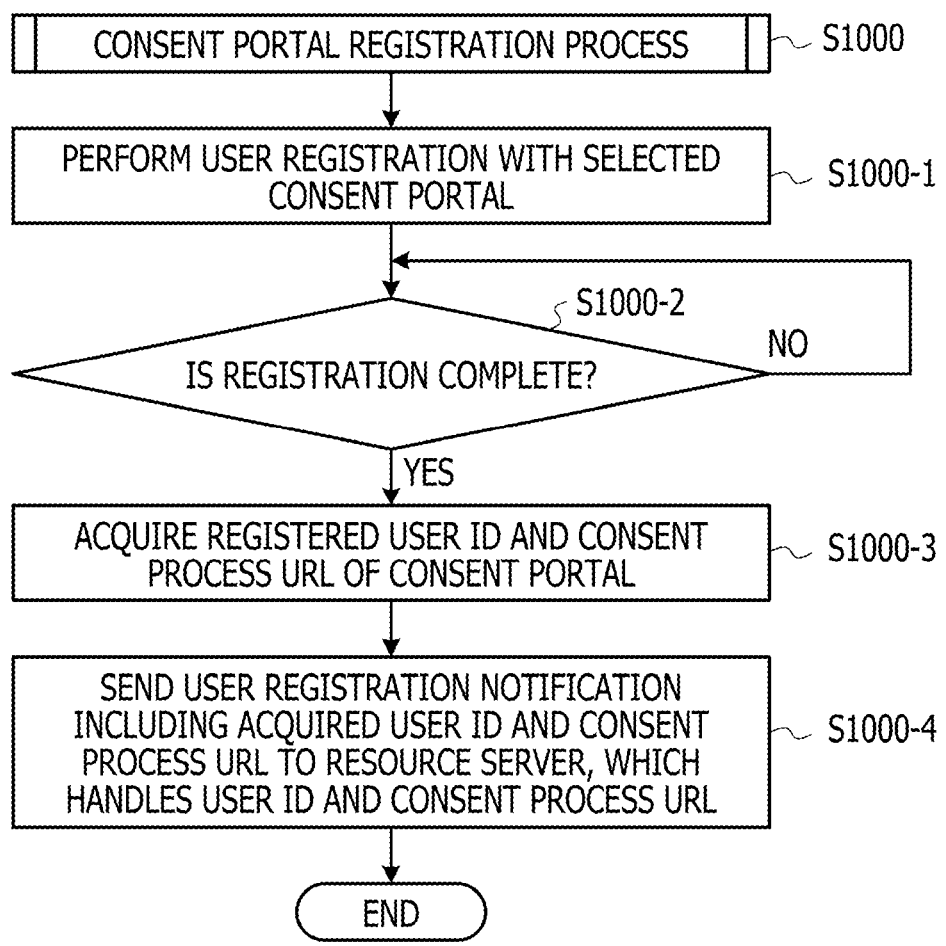
FIG. 6 is a diagram illustrating an example of a process flowchart of a consent portal registration process S1000.

FIG. 6 is a diagram illustrating an example of a process flowchart of the consent portal registration process S1000. In the consent portal registration process S1000, a user (the personal terminal 100) performs user registration with a selected consent portal (S1000-1). The user waits for completion of the registration with the consent portal (No in S1000-2).

When the user registration is complete (Yes in S1000-2), the user acquires the user ID and the consent process URL of the consent portal (S1000-3). The user notifies the acquired user ID and consent process URL to the resource server, which handles the user ID and the consent process URL.

Returning to the sequence in FIG. 5, the user U1 uses the personal terminal 100-1 and, for example, accesses a registration screen on the Web of the consent portal 200-1 (S100, S1000-1 in FIG. 6). The user U1 opens a screen for new user registration of the consent portal 200-1, and performs user registration by entering information used for the registration.

The consent portal 200-1 sends a user ID for accessing the consent portal 200-1 and a consent process URL to the personal terminal 100-1, and provides notification to the user U1 (S101, S1000-3 in FIG. 6). Depending on the type of a consent portal, a new registration user may determine a user ID. In this case, in S101, the consent portal 200-1 does not have to provide notification of the user ID. The consent portal 200-1 may notify the user U1 of the user ID and the consent process URL by methods such as by displaying the user ID and the consent process URL on a Web screen of the consent portal 200-1, other than by sending a message.

When the user U1 (or the personal terminal 100-1) acquires the user ID and the consent process URL, the user U1 (or the personal terminal 100-1) sends user registration notification including the acquired user ID and consent process URL, to the resource server 400, which handles the user ID and the consent process URL (S102, S1000-4 in FIG. 6). When the resource server 400 receives the user registration notification, the resource server 400 performs a user registration process S2000.

Figure 7:
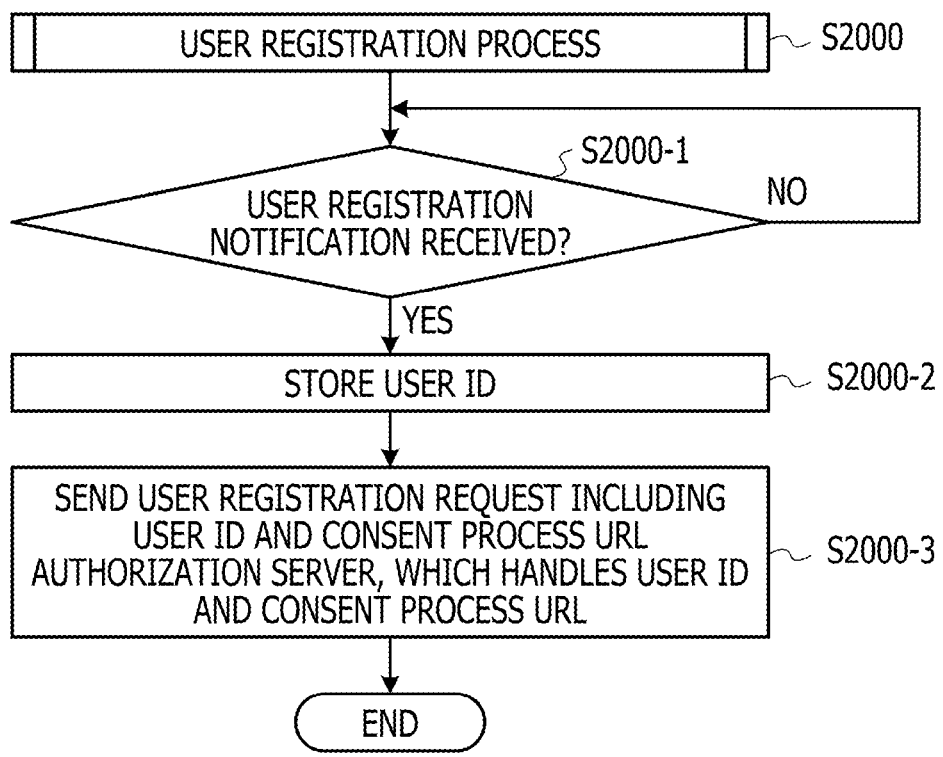
FIG. 7 is a diagram illustrating an example of a process flowchart of a user registration process S2000.

FIG. 7 is a diagram illustrating an example of a process flowchart of the user registration process S2000. The resource server 400 waits to receive the user registration notification (No in S2000-1). When the resource server 400 receives the user registration notification (Yes in S2000-1), the resource server 400 stores the user ID and the consent process URL included in the user registration notification in association with each other (S2000-2). The resource server 400 sends a user registration request including the user ID and the consent process URL to the authorization server 300, which handles the user ID and the consent process URL (S2000-3).

Returning to the sequence in FIG. 5, in the user registration process S2000, the resource server 400 receives the user registration notification (S102, Yes in S2000-1 in FIG. 7) and stores the user ID of the user U1 and the consent process URL of the consent portal 200-1 in association with each other (S2000-2 in FIG. 7). The resource server 400 sends a user registration request including the user ID of the user U1 and the consent process URL of the consent portal 200-1, to the authorization server 300 (S103, S2000-3 in FIG. 7).

When the authorization server 300 receives the user registration request, the authorization server 300 performs a user and consent portal storage process. The user and consent portal storage process is a process of storing the user ID and the consent process URL, which are included in the user registration request, in association with each other in the consent portal association table 324 included in the authorization server 300. The authorization server 300 stores the user ID of the user U1 and the consent process URL of the consent portal 200-1 in association with each other.

FIG. 8 is a diagram illustrating an example of the consent portal association table 324 after the user registration request in S103 is received. The information elements of the consent portal association table 324 include, for example, the user ID and the consent process URL. The authorization server 300 stores "user1@example.com", which is the user ID of the user U1, and "http://portal.example.com/api/user1", as the consent process URL corresponding to the user U1 (shaded area).

This enables the authorization server 300 to recognize a user and the URL of the consent portal 200 used by the user in association with each other.

In the example described above, user registration with the consent portal 200 is newly performed in the initial registration process. However, in the case where the user has already performed user registration with a consent portal, the resource server 400 may be notified of the consent process URL of the consent portal with which the user has already performed registration. In this case, the user registration process with the consent portal may be omitted.

<Access Consent Process>

Figure 9:
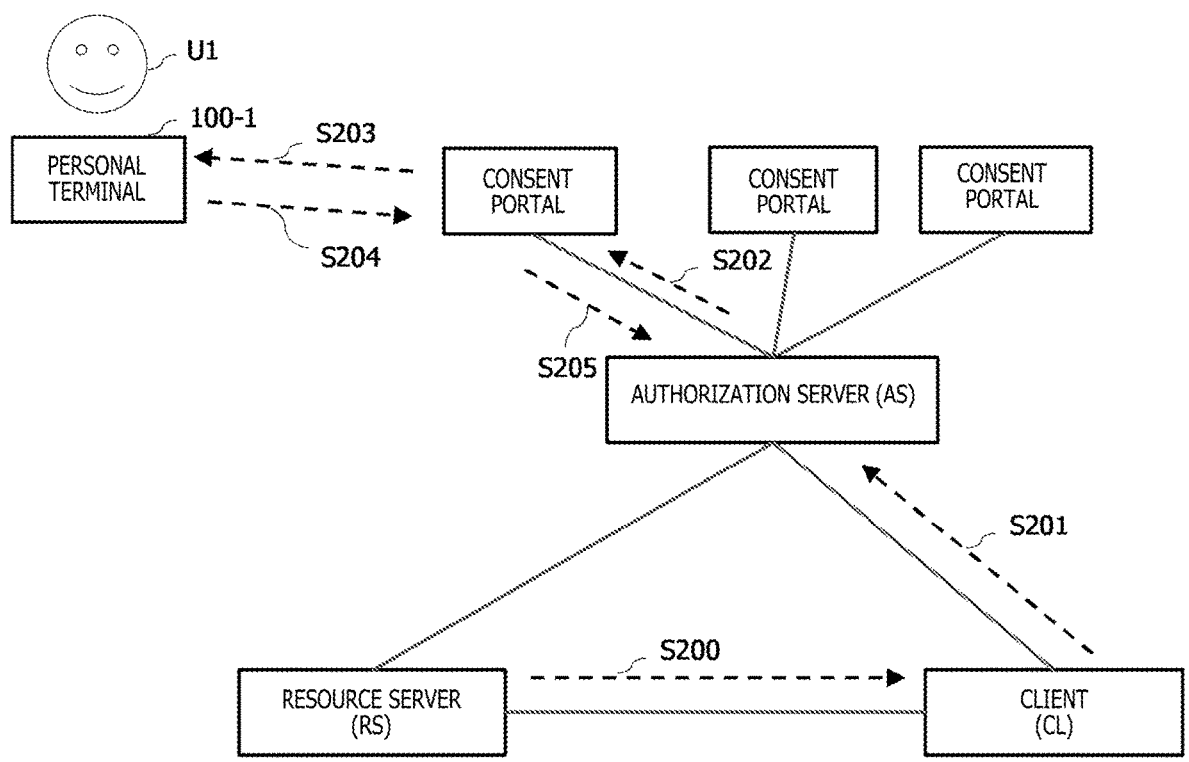
FIG. 9 is a diagram illustrating an example of a sequence of an access consent process.

FIG. 9 is a diagram illustrating an example of a sequence of the access consent process. The access consent process is a process in which, in the case where a client accesses personal information, the client requests the user of the personal information to consent to the access.

When, for example, the client 500 recognizes that the desired personal information is stored in the resource server 400, the client 500 makes a data access request to the resource server 400. The resource server 400 notifies the client 500 of the URL of the authorization server 300 whose subordinate is the consent portal 200 of the user having the personal information (S200).

When the client 500 acquires the URL of the authorization server 300, the client 500 uses the URL to send, to the authorization server 300, a consent request requesting the authorization server 300 to obtain consent for data access (S201). At this point, the client 500 sends, together with the consent request, conditions representing what kind of consent of the user is wanted. For example, the client 500 sends desirable data conditions, such as what kind of age group the user belongs to, what kind of category the data falls in, or when the data was updated. When the authorization server 300 receives the consent request, the authorization server 300 performs a consent control process S4000.

Figure 10:
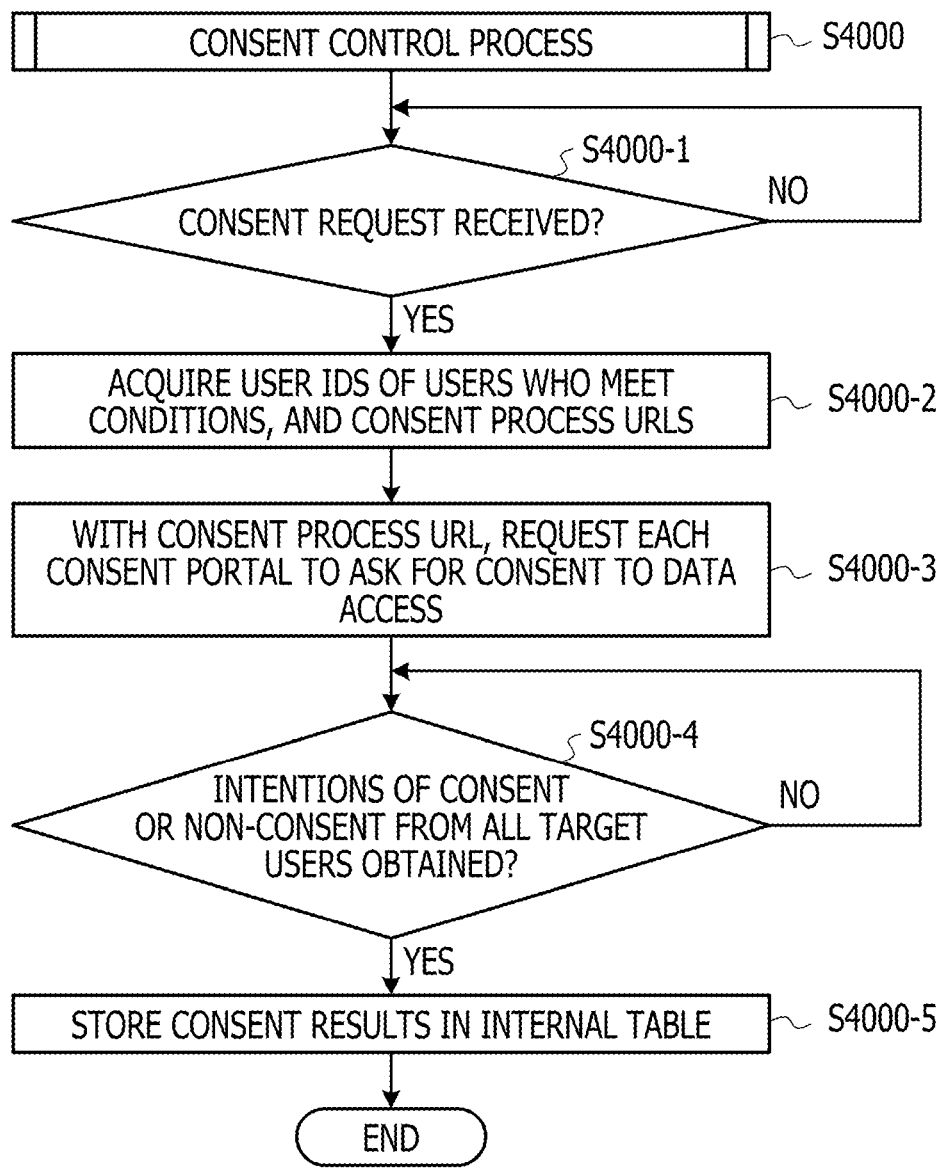
FIG. 10 is a diagram illustrating an example of a process flowchart of a consent control process S4000.

FIG. 10 is a diagram illustrating an example of a process flowchart of the consent control process S4000. In the consent control process S4000, the authorization server 300 waits to receive a consent request (No in S4000-1). When the authorization server 300 receives a consent request (Yes in S4000-1), the authorization server 300 acquires the user IDs of users who meet the conditions and the consent process URLs (S4000-2). The authorization server 300 detects users who meet the conditions, from data stored in the data management table 325, and acquires consent process URLs associated with the user IDs of the users, from the consent portal association table 324.

Using the acquired consent process URLs, the authorization server 300 requests the consent portals 200 of the users, who meet the conditions, to ask for consent to data access (S4000-3). The authorization server 300, for example, posts a sentence of text asking for consent, to a consent process URL, and confirms the user whether the user has an intention of consent or non-consent to data access.

The authorization server 300 waits to obtain the intentions of consent or non-consent from all the consent target users (No in S4000-4). The authorization server 300 may recognize the intention of non-consent, for example, if the intention of consent has not been expressed by the user within a predetermined time.

When the authorization server 300 obtains the intentions of consent or non-consent from all the target users (Yes in S4000-4), the authorization server 300 stores consent results (results of the intentions of consent or non-consent) in an internal table (S4000-5), and the process is complete.

Returning to the sequence in FIG. 9, in the consent control process S4000, the authorization server 300 identifies the user U1 who meets the conditions, and requests the consent portal 200-1 of the user U1 to ask for consent (S202, S4000-3 in FIG. 10). The consent portal 200-1 sends a message to the personal terminal of the user UI or displays a screen requesting consent (S203). The user U1, for example, consents to access to data and notifies the consent portal 200-1 of the consent to data access (S204), and the consent portal 200-1 notifies the authorization server 300 of the consent (S205).

The authorization server 300 obtains the intentions of consent or non-consent from all the target users including the user U1 (S205, S4000-4 in FIG. 10) and stores the intentions of consent or non-consent of all the users, which include the consent of the user U1, in the internal table (S4000-5 in FIG. 10).

The authorization server 300 stores, in addition to the intentions of consent or non-consent of the users, what kind of conditions the data has. This enables the authorization server 300 to recognize which user permits access to what kind of personal information and to control data access in accordance with the intention of consent of the user.

<Data Registration Process>

Figure 11:
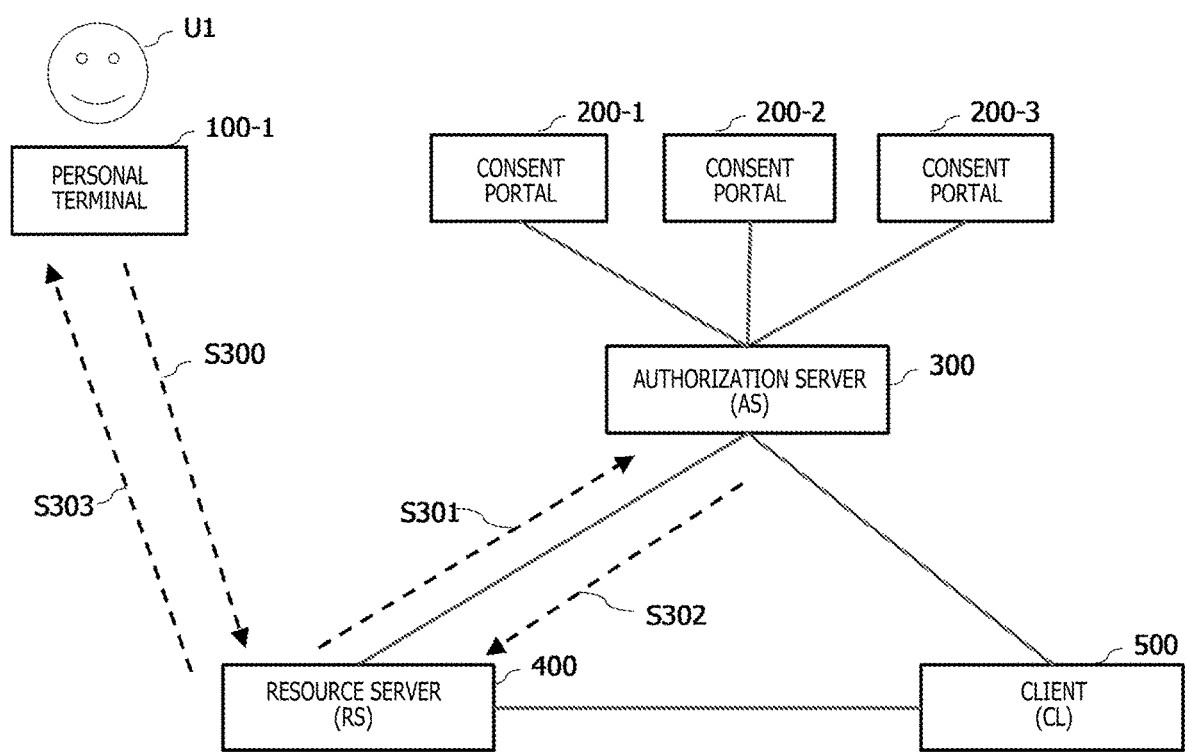
FIG. 11 is a diagram illustrating an example of a sequence of a data registration process.

FIG. 11 is a diagram illustrating an example of a sequence of the data registration process. The data registration process is a process in which a user registers personal information in the resource server 400.

The user U1 uses the personal terminal 100-1 to register personal information in the resource server 400 (S300). In the case of a plurality of resource servers 400, the user U1 selects one of the resource servers 400 in accordance with the type (category) of personal information to be registered and the attributes such as gender and age of the user U1.

When the resource server 400 acquires the personal information (data) of the user U1, the resource server 400 performs the data update control process. In the data update control process, the resource server 400 stores the data acquired from the user in an appropriate database. If, for example, the resource server 400 includes a database for each category, the resource server 400 stores the acquired data (as an update) in a database in accordance with the category of data to be updated. If, for example, the resource server 400 includes databases for each age, the resource server 400 stores the acquired data in a database in accordance with the age of the user.

The resource server 400 sends update information on the updated data to the authorization server 300 (S301). The update information may be information (difference information) indicating what kind of data the updated data is, or may be information (entire information) indicating what kind of information is stored in the entire data after the update. The update information includes, for example, the updated (newly registered) user ID of the user, the category of updated data, and so on. The resource server 400 sends the update information to notify the authorization server 300 what kind of data (personal information) is stored in the resource server 400.

When the authorization server 300 receives the update information, the authorization server 300 performs the data management process. The data management process is a process of storing the resource servers 400 and what kind of information stored in each resource server 400 in association with each other. The authorization server 300, for example, stores, in the data management table 325, the categories of data, user IDs, and so on stored in each resource server 400.

When the authorization server 300 updates the data management table 325, the authorization server 300 sends the identifier of the updated data (the identifier may hereafter be referred to as a data ID) to the resource server 400 (S302). The data ID is, for example, an identifier issued by the authorization server 300, and is used when the authorization server 300 manages data. The authorization server 300, for example, uses the data ID to control whether or not to permit access to data. The data IDs are, for example, issued for each user, for each category, for each database, and at every update (registration) time. Sending of a data ID may be performed only when a new user ID is issued.

When the resource server 400 receives the data ID, the resource server 400 notifies the user of the data ID (S303). By receiving the message, the user may recognize that an update of data is normally complete.

<Access Control Process>

Figure 12:
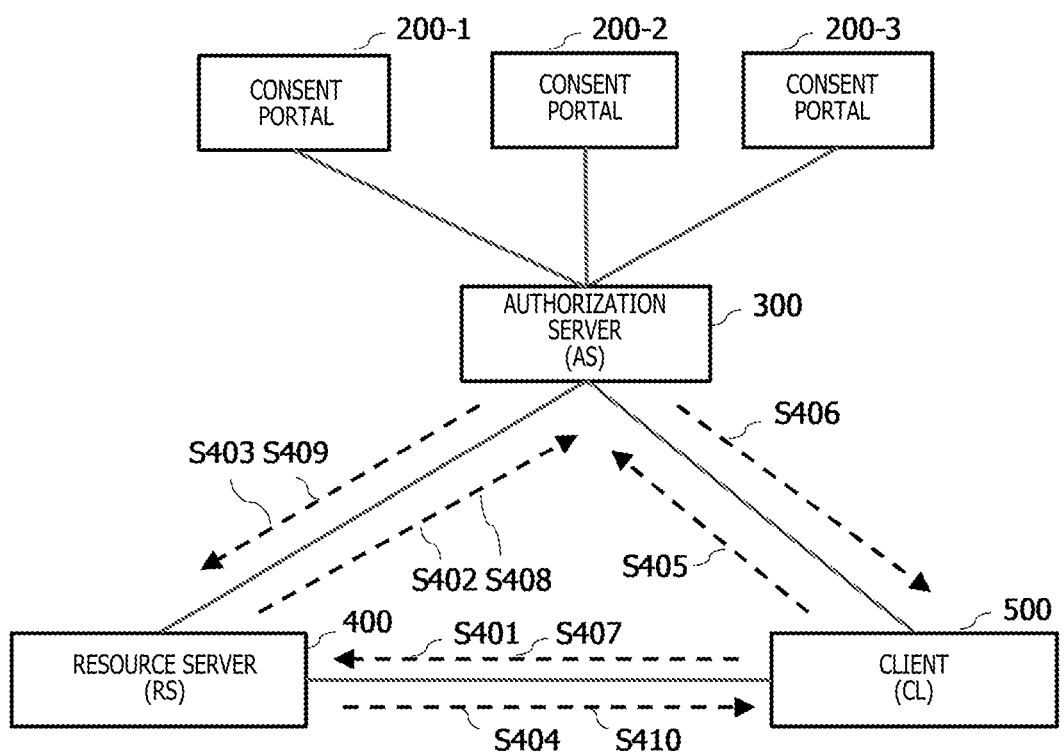
FIG. 12 is a diagram illustrating an example of a sequence of an access control process.

FIG. 12 is a diagram illustrating an example of a sequence of an access control process. The access control process is a process in which, after consent of the user is obtained, a request from the client 500 is responded and access to data is controlled. FIG. 12 illustrates an example of a sequence for the case where the user consents to the access to data.

The client 500 makes a data access request to the resource server 400 (S401). The client 500, for example, specifies conditions (the age of the user, the category, and so on) of the data to make a request for access.

The resource server 400 requests the authorization server 300 to authorize access to the data (S402). At this point, together with this, the resource server 400 notifies the authorization server 300 of the specified data conditions.

The authorization server 300 stores the specified data conditions, issues a ticket responding to the request, and sends the ticket back to the resource server 400 (S403). The ticket is issued to the client 500, and, for example, the specified conditions and the issue date and time are described on the ticket.

The resource server 400 sends the URL (or address) of the authorization server 300 and the acquired ticket to the client 500 (S404).

Using the acquired URL, the client 500 requests a token from the authorization server 300 (S405). During requesting a token, the client 500 sends the acquired ticket to the authorization server 300.

The authorization server 300 issues a token to permit the client 500 to access data that matches the stored data conditions and for which consent to access is obtained (the data may hereafter be referred to as consent data). The authorization server 300 sends the issued token to the client 500 (S406).

The client 500 sets the acquired token and sends the token to the resource server 400 to request access to data (S407).

The resource server 400 sends the received token to the authorization server 300 (S408).

The authorization server 300 sends information on the consent data corresponding to the received token to the resource server 400 (S409).

Based on the received information on the consent data, the resource server 400 permits the client 500 to access the corresponding consented data and discloses this consent data to the client 500 (S410).

<Comparison with Integrated System>

In the first embodiment, the data management system 10 is a separate system in which the consent portal 200 and the authorization server 300 are installed to be separated from each other (as different devices). A comparison is made with an integrated system in which the consent portal 200 and an authorization server are installed integrally (as the same device).

Figure 13:
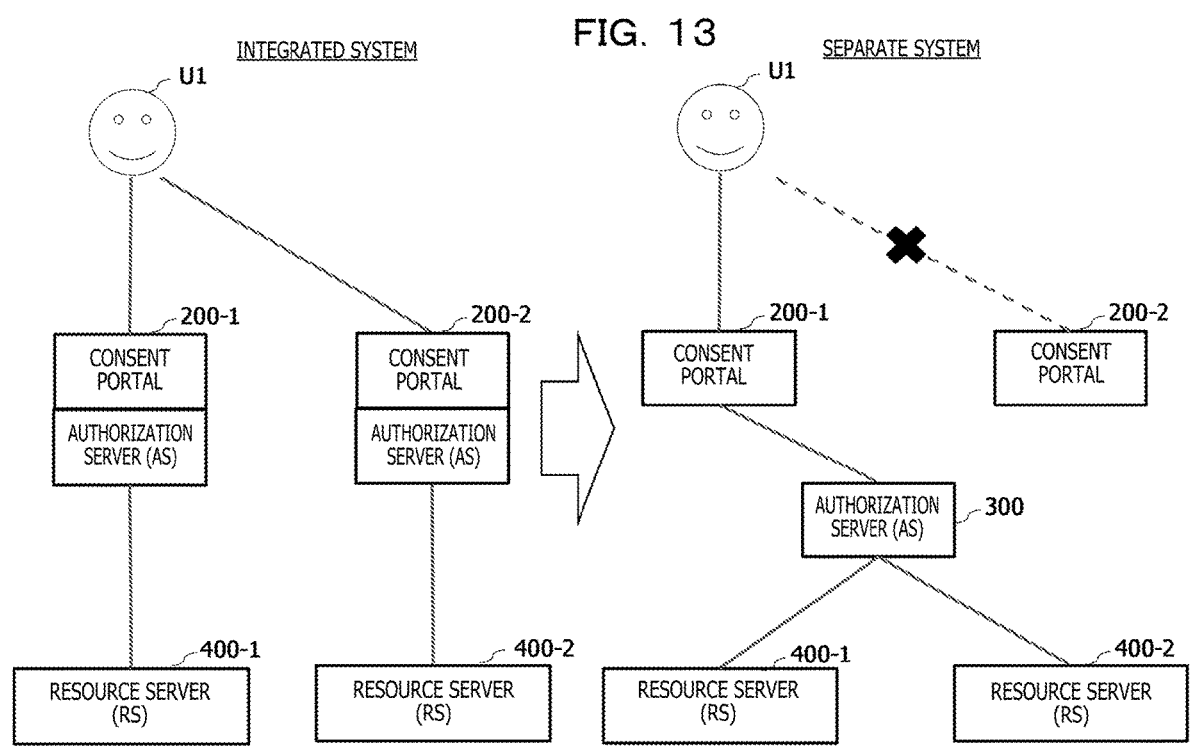
FIG. 13 is a diagram illustrating examples of relationships between the resource server and the authorization server in an integrated system and a separate system.

FIG. 13 is a diagram illustrating examples of relationships between a user and consent portals in an integrated system and a separate system. With reference to FIG. 13, the case where there are resource servers 400-1 and 400-2 as the resource servers 400 will be described.

In the case where the resource servers 400-1 and 400-2 belong to different consent portals 200-1 and 200-2 (authorization server function units integrated with consent portals), respectively, an integrated system has a configuration as illustrated in the left figure of FIG. 13. In this case, the user U1 is unable to register data in the resource servers 400-1 and 400-2 unless the user U1 registers with both the consent portals 200-1 and 200-2.

In contrast, the separate system has a configuration as illustrated in the right figure of FIG. 13. In this case, the user U1 may register data in both the resource servers 400-1 and 400-2, without registering with the consent portal 200-2.

As illustrated in FIG. 13, in the first embodiment, the user registers with a smaller number of consent portals 200 than the number of resource servers 400 in which data is to be registered, thereby enabling registration of the data. This enables the user to simplify the management of the consent portals 200.

Figure 14:
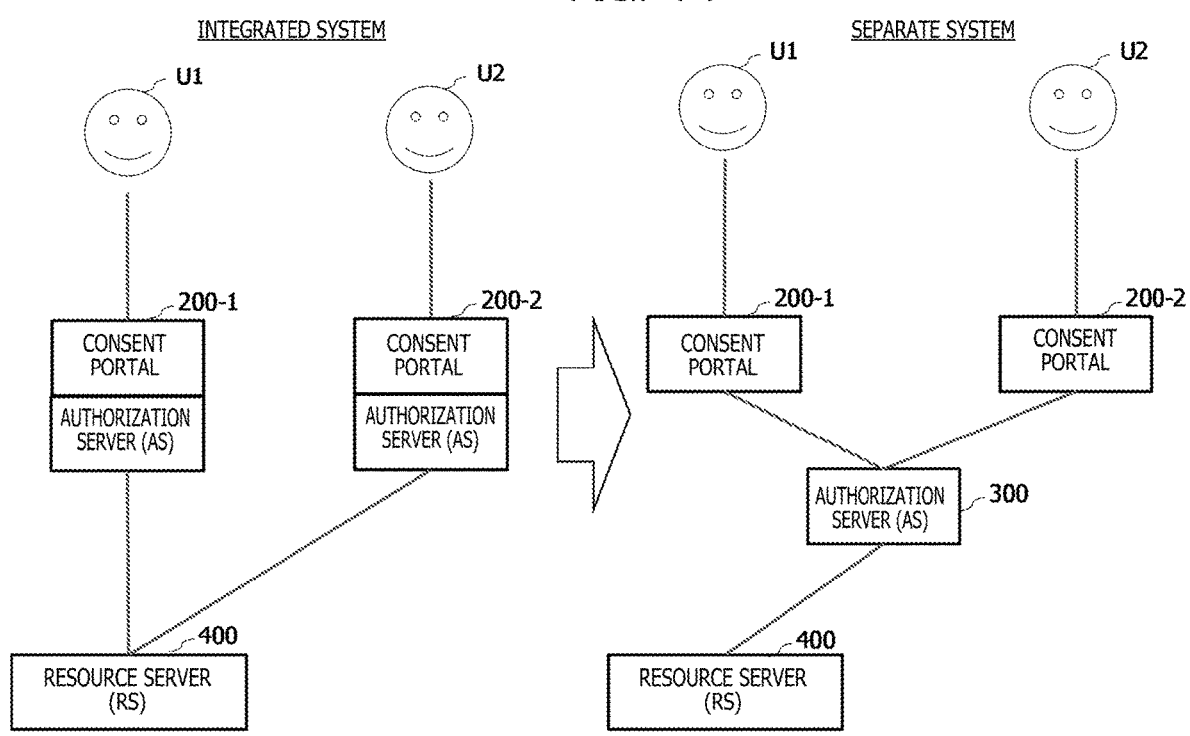
FIG. 14 is a diagram illustrating examples of relationships between the resource server and the authorization server in an integrated system and a separate system.

FIG. 14 is a diagram illustrating examples of relationships between the resource server and the authorization server in an integrated system and a separate system. FIG. 14 illustrates an example of the case where a plurality of users use different consent portals 200-1 and 200-2, respectively.

The integrated system has a configuration as illustrated in the left figure of FIG. 14. In this case, on the occasion of sending a message to the authorization servers during making a request for data access permission, during updating data, or the like, the resource server 400 is to send the message to each of the authorization servers. For example, if UMA2.0 is used as the protocol, messages may not be sent simultaneously to a plurality of authorization servers, and therefore messages are sequentially sent. This may result in the occurrence of a temporal delay.

In contrast, the separate system has a configuration as illustrated in the right figure of FIG. 14. In this case, the resource server 400 may handle a plurality of users by sending a message to the authorization server 300.

As illustrated in FIG. 14, the number of messages sent and received between the resource server 400 and the authorization server 300 may be reduced, and the reduction in the use of communication resources and the reduction in temporal delays may be achieved.

Second Embodiment

A second embodiment will be described. The second embodiment is an example in which a combined authorization server 300 is added to the integrated system described above.

<Example of Configuration of Data Management System>

FIG. 15 is a diagram illustrating an example of a configuration of the data management system 10. The data management system 10 includes the personal terminals 100-1 to 100-3 that the users U1 to U3 respectively use, the consent portals 200-1 (which respectively include authorization servers) respectively corresponding to the users U1 to U3, the combined authorization server 300, the resource server 400, and the client 500.

The combined authorization server 300 performs processing similar to that of the authorization server 300 in the first embodiment. For example, an authorization server integrated with a consent portal may perform processing similar to that in the integrated system, and does not have to perform processing (for example, management of data and access control) that the combined authorization server 300 performs.

In the second embodiment, the combined authorization server 300 is added to the system, and therefore the effects similar to those in the first embodiment may be obtained. For example, in the case where there is already an integrated system, it is sufficient only to add a combined authorization server, without replacing a consent portal. This may reduce the cost and time for rebuilding a system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor included in an authorization server to execute a process, the process comprising:
    storing an association relationship between a plurality of users who are owners of data, and a consent portal with which each of the plurality of users performs user registration;
    when access to data of a first condition is asked for by a client, detecting one or more target users who is an owner of data that matches the first condition, extracting a consent portal with which the one or more target users performs user registration, from the association relationship, sending a request for consent to a user terminal of each of the one or more target users, and receiving an intention of consent or non-consent to access to the data, from the one or more target users based on the received intention of consent or non-consent to access to the data;
    updating the intention of consent or non-consent to access to the data when the data of the one or more target users is updated; and
    controlling an access by the client to data in a resource server, in accordance with the received updated intention of consent or non-consent to access to the data.

2. The non-transitory computer-readable storage medium according to claim 1, wherein the storing includes:
    obtaining consent portal information including a user identifier and a consent process Uniform Resource Locator (URL) when the user performs user registration with the consent portal, the user identifier identifies a user in the consent portal, the consent process URL is used when the intention is obtained by using the consent portal, and
    storing the user identifier and the consent process URL as the association relationship.

3. The non-transitory computer-readable storage medium according to claim 2, wherein
the consent portal information is acquired from the user via the resource server.

4. The non-transitory computer-readable storage medium according to claim 1, wherein
User-Managed Access (UMA) is used as a protocol in communication with both or one of the resource server and the consent portal.

5. A data access control method comprising:
storing an association relationship between a plurality of users who are owners of data, and a consent portal with which each of the plurality of users performs user registration, the data being stored in a resource server;
detecting one or more target users who is an owner of data that matches a first condition when access to data of the first condition is asked for by a client;
extracting a consent portal with which the one or more target users performs user registration, from the association relationship;
receiving an intention of consent or non-consent to access to the data, from the one or more target users based on the received intention of the consent or non-consent to access to the data;
updating the intention of consent or non-consent to access to the data when the data of the one or more target users is updated; and
controlling an access by the client to data in the resource server, in accordance with the received updated intention of consent or non-consent to access to the data.

6. A authorization server comprising:
a memory configured to store an association relationship between a plurality of users who are owners of data, and a consent portal with which each of the plurality of users performs user registration, the data being stored in a resource server;
a processor configured to:
when access to data of a first condition is asked for by a client, detect one or more target users who is an owner of data that matches the first condition,
extract a consent portal with which the one or more target users performs user registration, from the association relationship,
receive an intention of consent or non-consent to access to the data, from the one or more target users based on the received intention of the consent or non-consent to access to the data;
update the intention of consent or non-consent to access to the data when the data of the one or more target users is updated; and
control an access by the client to data in the resource server, in accordance with the received updated intention of consent or non-consent to access to the data.

* * * * *